United States Patent
Johannaber et al.

(10) Patent No.: US 9,046,885 B2
(45) Date of Patent: Jun. 2, 2015

(54) METHOD FOR ASCERTAINING FUNCTIONAL PARAMETERS FOR A CONTROL UNIT

(75) Inventors: Martin Johannaber, Schwieberdingen (DE); Marcus Boumans, Ludwigsburg (DE); Markus Bossler, Fellbach (DE); Maximilian Reger, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 432 days.

(21) Appl. No.: 13/510,100

(22) PCT Filed: Dec. 2, 2010

(86) PCT No.: PCT/EP2010/068750
§ 371 (c)(1),
(2), (4) Date: Jul. 26, 2012

(87) PCT Pub. No.: WO2011/082908
PCT Pub. Date: Jul. 14, 2011

(65) Prior Publication Data
US 2012/0283848 A1  Nov. 8, 2012

(30) Foreign Application Priority Data
Dec. 17, 2009  (DE) .......................... 10 2009 054 905

(51) Int. Cl.
| | |
|---|---|
| G06F 19/00 | (2011.01) |
| G05B 19/042 | (2006.01) |
| F02D 41/14 | (2006.01) |
| F02D 41/24 | (2006.01) |
| G05B 13/04 | (2006.01) |
| G05B 17/00 | (2006.01) |

(52) U.S. Cl.
CPC ........ *G05B 19/0426* (2013.01); *F02D 41/1406* (2013.01); *F02D 41/2432* (2013.01); *G05B 13/042* (2013.01); *G05B 17/00* (2013.01); *G05B 2219/23117* (2013.01)

(58) Field of Classification Search
None
See application file for complete search history.

(56) References Cited

U.S. PATENT DOCUMENTS

| | | | | |
|---|---|---|---|---|
| 4,922,428 | A | * | 5/1990 | Takahashi ....................... 701/94 |
| 5,347,446 | A | * | 9/1994 | Iino et al. ........................ 700/29 |
| 5,457,625 | A | * | 10/1995 | Lim et al. ........................ 700/29 |
| 5,559,690 | A | * | 9/1996 | Keeler et al. .................... 700/44 |

(Continued)

FOREIGN PATENT DOCUMENTS

| | | |
|---|---|---|
| DE | 100 20 448 | 10/2001 |
| DE | 10020448 | 10/2001 |

(Continued)

OTHER PUBLICATIONS

International Search Report, PCT International Application No. PCT/EP2010/068750, dated Apr. 28, 2011.

*Primary Examiner* — Mohammad Ali
*Assistant Examiner* — Kelvin Booker
(74) *Attorney, Agent, or Firm* — Kenyon & Kenyon LLP

(57) ABSTRACT

A method for ascertaining functional parameters for a control unit and to a control unit in which the provided method is carried out. The control unit is provided for controlling a technical system wherein, in the method, at least one target variable on a system response is specified and a variation of the functional parameters is carried out, from a response received to the functional parameters, a valuation being carried out of the set functional parameters while taking into account the at least one specified target variable.

18 Claims, 1 Drawing Sheet

(56) References Cited

U.S. PATENT DOCUMENTS

| | | | |
|---|---|---|---|
| 6,816,776 B2* | 11/2004 | Yasui et al. | 701/110 |
| 6,839,598 B2* | 1/2005 | Yasui et al. | 700/31 |
| 6,848,420 B2* | 2/2005 | Ishiguro et al. | 123/399 |
| 6,859,717 B2* | 2/2005 | Yasui et al. | 701/99 |
| 6,990,403 B2* | 1/2006 | Yasui et al. | 701/110 |
| 7,050,863 B2* | 5/2006 | Mehta et al. | 700/29 |
| 7,050,865 B2* | 5/2006 | Yasui et al. | 700/37 |
| 7,110,834 B2* | 9/2006 | Martin et al. | 700/29 |
| 7,194,318 B2* | 3/2007 | Attarwala | 700/29 |
| 7,231,265 B2* | 6/2007 | Yasui et al. | 700/29 |
| 7,251,536 B2* | 7/2007 | Hashimoto et al. | 700/29 |
| 7,262,536 B2* | 8/2007 | Rahman et al. | 310/156.35 |
| 7,330,767 B2* | 2/2008 | Thiele et al. | 700/29 |
| 7,337,022 B2* | 2/2008 | Wojsznis et al. | 700/36 |
| 7,376,472 B2* | 5/2008 | Wojsznis et al. | 700/29 |
| 7,592,766 B2* | 9/2009 | Patel et al. | 318/400.02 |
| 7,826,909 B2* | 11/2010 | Attarwala | 700/45 |
| 8,055,358 B2* | 11/2011 | Blevins et al. | 700/28 |
| 8,065,022 B2* | 11/2011 | Minto et al. | 700/29 |
| 8,224,476 B2* | 7/2012 | Chu et al. | 700/129 |
| 8,326,505 B2* | 12/2012 | Cesario et al. | 701/70 |
| 2002/0087221 A1* | 7/2002 | Keeler et al. | 700/48 |
| 2003/0139826 A1* | 7/2003 | Yasui et al. | 700/31 |
| 2003/0144747 A1* | 7/2003 | Shakespeare | 700/28 |
| 2003/0187522 A1* | 10/2003 | Yasui et al. | 700/28 |
| 2003/0187564 A1* | 10/2003 | Yasui et al. | 701/102 |
| 2003/0229407 A1* | 12/2003 | Yasui et al. | 700/29 |
| 2003/0229408 A1* | 12/2003 | Yasui et al. | 700/30 |
| 2004/0006420 A1* | 1/2004 | Yasui et al. | 701/110 |
| 2004/0035393 A1* | 2/2004 | Ishiguro et al. | 123/399 |
| 2004/0049295 A1* | 3/2004 | Wojsznis et al. | 700/28 |
| 2004/0049296 A1* | 3/2004 | Hashimoto et al. | 700/28 |
| 2004/0049299 A1* | 3/2004 | Wojsznis et al. | 700/29 |
| 2004/0049300 A1* | 3/2004 | Thiele et al. | 700/29 |
| 2004/0117766 A1* | 6/2004 | Mehta et al. | 717/121 |
| 2005/0035676 A1* | 2/2005 | Rahman et al. | 310/83 |
| 2007/0168057 A1* | 7/2007 | Blevins et al. | 700/53 |
| 2008/0030155 A1* | 2/2008 | Patel et al. | 318/400.02 |
| 2009/0295316 A1* | 12/2009 | Patel et al. | 318/400.02 |
| 2010/0100248 A1* | 4/2010 | Minto et al. | 700/287 |
| 2010/0168989 A1* | 7/2010 | Gao et al. | 701/110 |
| 2010/0198364 A1* | 8/2010 | Chen et al. | 700/8 |

FOREIGN PATENT DOCUMENTS

| | | |
|---|---|---|
| DE | 19858584 | 12/2007 |
| JP | 5-35309 | 2/1993 |
| JP | 6-249007 | 9/1994 |
| JP | 2006-72733 | 3/2006 |

* cited by examiner

METHOD FOR ASCERTAINING FUNCTIONAL PARAMETERS FOR A CONTROL UNIT

FIELD OF THE INVENTION

The present invention relates to a method for ascertaining functional parameters for a control unit, and such a control unit.

BACKGROUND INFORMATION

In injection systems for internal combustion engines, control unit functions, that are executed in the control units used, have to be designed according to requirements with respect to target variables and evaluation criteria of the manufacturer and the end customer, via functional parameters.

The complexities of the functions and consequently also the number of functional parameters rise with increasing requirements on the system. At the same time, however, the customer requires a simplification of the structures, since a complex software structure is only able to be handled using expert knowledge, and is difficult to apply.

The above-mentioned control unit functions offer the possibility of determining fixed settings, using a set of parameters, and in many cases also using a plurality of sets of parameters, via constants, characteristics curves and characteristics maps. One should note in this context that the complexity of the functions, and consequently also the number of characteristics maps, increase steadily. Function specialists, who in the most favorable case know the effect of each parameter, are thus able to design the functions according to the requirements of the customer.

The customer obtains his desired compromise from a multitude of optimal, possible compromises. Deviations from the requirements may be straightened out by recursion.

SUMMARY

According to the present invention, by using self-applying functions, a plurality of functional parameters, functional characteristics curves and functional characteristics maps are able to be reduced for the user to weighting characteristics maps that are a function of one or a few operating points. Thus, even in response to a rising complexity of the control unit functions, the complexity for the customer or the user is able to be reduced. The application takes place as a specification of the target variables and criteria, or rather their weightings. Consequently, the user does not have to be a function specialist in order to implement the desired requirements on the system. Furthermore, it is not required that the user know the functional parameters.

The example method in accordance with the present invention makes possible an application by the direct specification of objective target variables or criteria to a function in the control unit.

One should note that, because of the ever increasingly more complex software structures, the technical requirements and the effort in the application are growing both internally and also at the customer's place. The use of self-applying functions, having weighting characteristics maps, in the control unit makes it possible to change and specify the system response directly via the target variables or the evaluation criteria or their weightings. For the user, a plurality of functional parameters, functional characteristics curves and functional characteristics maps are able to be reduced to weighting characteristics maps that are a function of one or a few operating points.

The example embodiment of the present invention makes possible an application via setting target variables, and in this context, the concentration applies to the target variables and not the functional parameters. This leads to a reduction in the complexity for the user, particularly since no function specialist is required for coordination.

With the use of the example method provided, a systematic procedure having an objective valuation of the settings is possible. Furthermore, recursions for the adjustment of the requirements are less costly. A reduction of characteristics map structures in the control unit may also be achieved, in some instances.

Using the method, it is possible to develop a control unit function or to broaden existing control unit functions, so that they apply themselves autonomously. The functional targets are specified by the applicator or customer in development via one or more weighting characteristics maps of the target variables and criteria. The function learns the internal functional parameters required for this.

Additional advantages and developments of the present invention result from the specification and the figures.

It is understood that the features mentioned above and the features described below may be used not only in the combination given in each case but also in other combinations or individually, without departing from the scope of the present invention.

DETAILED DESCRIPTION OF EXAMPLE EMBODIMENTS

Figure 1:
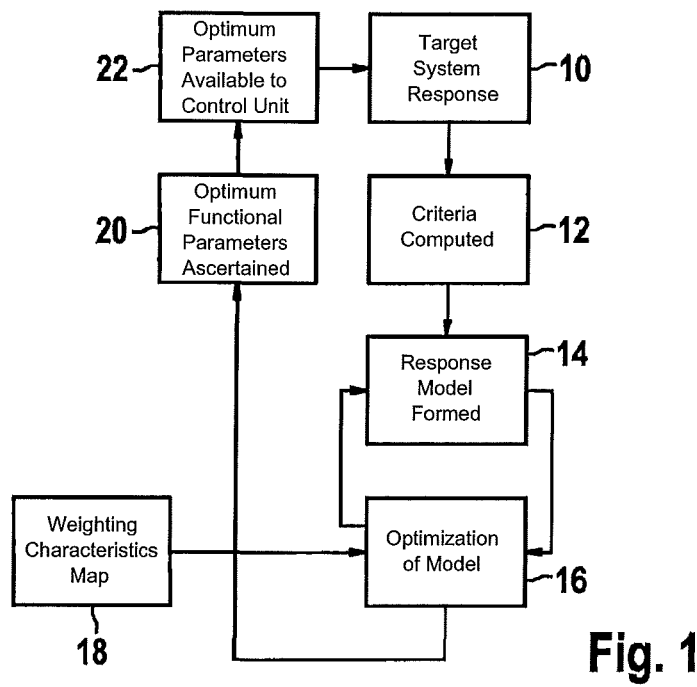
FIG. 1 shows a schematic representation of an example embodiment of the method described.

The present invention is represented schematically in the drawings with the aid of specific embodiments, and is described in detail below with reference to the drawings.

FIG. 1 shows a method sequence which directly carries out parameter variations, such as functional parameters, on a target system or system 10, and in which system 10 is operated at different operating points. From the system response, criteria from system 10 are computed in a step 12. From the computed criteria and the specified target variables, a mathematical model, for instance, or a criteria model 14 is then formed which sets up the dependencies of the target variables and the criteria on the parameters.

Based on the specified weighting criteria from a weighting characteristics map 18, an optimizer 16 is able to optimize model 14 on the latter and ascertain the optimum functional parameters 20, and make these available to the actual functions of control unit 22 and update them again and again, the optimizer 16 being able to take into account the development of system responses and the criteria computed on the system responses, for instance, by a gradient observation or a gradient evaluation.

Thus, system 10 initially runs using starting parameters of the control unit function. In this context, system 10 is operated at any operating point using the set functional parameters 20, supplying output variables on which criteria are computed. The criteria model or response model 14 is set up using these criteria. Optimizer 16 ascertains the optimum parameters having specified weighting in the measured range of response model 14 and changes the corresponding functional parameters using the results.

This means that system 10 uses functional parameters at the beginning, which were specified or taken over, for example. However, these are not usually coordinated with system 10, that is, they are not optimal for system 10.

At the beginning of the ascertainment of functional parameters 20, a response model 14 is usually nonexistent. However, a response model 14 of a similar system 10 may be stored.

System 10 is then operated at different operating points and, in the process, it learns its own response at different operating points. In this process, optimizer 16 of the function specifies parameter combinations, which represent a prognosis of optimizer 16 with regard to an improvement of response model 14. Consequently, parameter combinations are tried that are supposed to improve the response of system 10. Response model 14 is broadened by the criteria and the parameter combination. Using the broadened parameter combination and the associated criteria, a new broadened response model 14 is computed.

Optimizer 16 uses response model 14, and checks whether the parameter specification has led to the improvement or the worsening of the response of system 10. Because of this, optimizer 16 gradually ascertains the combination of parameters at which the optimal response of system 10 with regard to the criteria sets in or comes about. This takes place in an iterative sequence, in which response model 14 grows until the optimal response has been found. This is performed for each operating point.

Optimizer 16 ascertains in each case the optimal parameter of response model 14 in the measured range, and outputs a prognosis on whether a further improvement of the response is able to be achieved. It is the task of optimizer 16 to value the criteria of response model 14 according to the specification from the weighting characteristics maps.

In this context, the specification to optimizer 16 may be a summed criterion of weightings, for which optimizer 16 finds only one solution of the parameters. Alternatively, the function may be designed so that optimizer 16 supplies a plurality of functional parameters 20 via a multi-target optimization, and the choice of functional parameters takes place via the weighting of the criteria from a memory or a model of optimal parameters. In this case, the weighting criteria may be shifted at any time after the learning of criteria model 14. Functional parameters 20 become effective immediately. The user is able to apply this, in this manner, without having to know functional parameters 20.

Two phases are created in this context:
1. Rapid learning of functional parameters 20 and application by coordinating weighting characteristics maps 18.
2. Slow adjustment of functional parameters 20 over the lifetime.

A switching over of phases may take place via the data of the learned operating response.

After the second phase, if, via a multi-target optimization, there is present a memory or a model of optimal parameters for the function, the weightings may be changed at any time, for example, by switching over different weighting characteristics maps or by regulation directly on the weightings.

Figure 2:
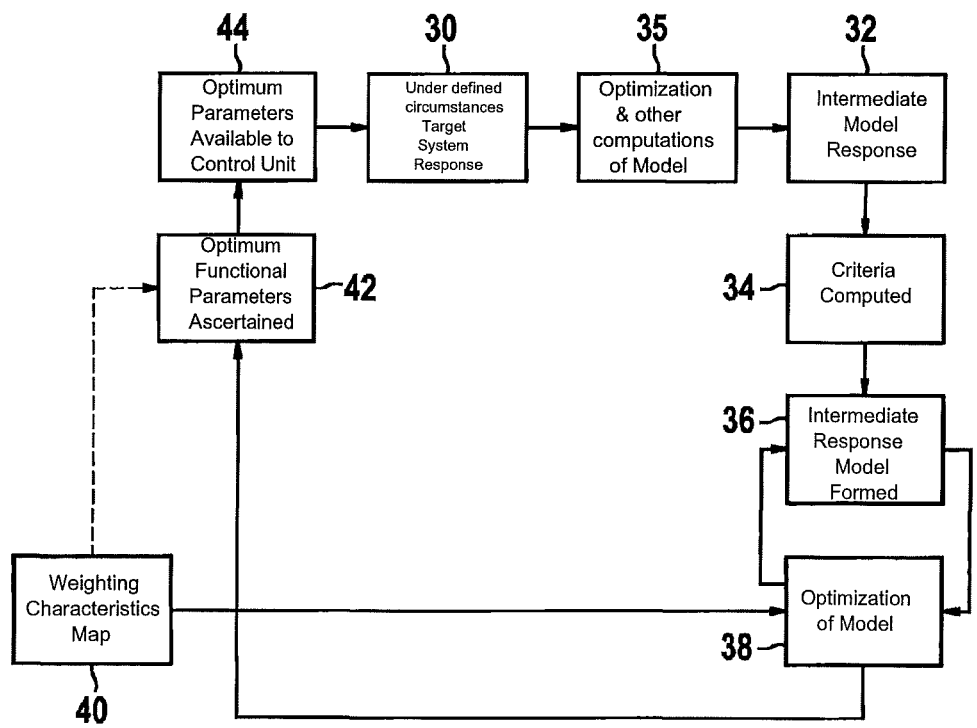
FIG. 2 shows an additional example embodiment of the method.

FIG. 2 shows a similar sequence to that in FIG. 1, the difference being that parameters are not being varied directly on a system 30, but via an intermediate model 32, so as to avoid perceivable effects of the variations.

Intermediate model 32 replaces system 30, and is adjusted to system 30 under definable circumstances by identification, optimization and by other computations (block 35).

Criteria from intermediate model 32 are computed from the response of intermediate model 32. From the computed criteria and target variables, a mathematical model, for instance, or a criteria model 36 is then formed which sets up the dependencies of the target variables and the criteria on the parameters.

An optimizer 38 is then able to optimize on this model 36, by the specification of weighting criteria and from a weighting characteristics map 40, and ascertain the optimal functional parameters 42, and provide these to the actual control unit functions 44 and repeatedly update them. The optimization may also be computed during hunting of the control unit.

One alternative is to compute this method outside of the control unit software, and using a tool having an intersection with the control unit, thus to transmit the settings to the experimental object. The results of the adjustment are then available directly in the control unit, or have to be transferred, via the tool, to the control unit, after the adjustment.

One particular advantage is that the control unit software does not have to be changed. It should be noted, however, that it is possible that various setups or regulations cannot be implemented using the weightings. In addition, an additional tool has to be available for the application and also to the customer.

What is claimed is:

1. A method for optimizing a system having a plurality of functional parameters, the method comprising:
   specifying at least one of the plurality of functional parameters from a response of the system as a target variable;
   iteratively determining, by an optimizer, optimized functional parameters according to the specified target variable by:
      monitoring the response of the plurality of functional parameters of the system;
      computing criteria from the monitored response;
      forming a model having dependencies in the computed criteria according to the specified target variable; and
      optimizing the formed model by:
         varying at least one weighting of the plurality of functional parameters, and
         valuating the varied at least one weighting of the plurality of functional parameters, by taking into account the specified target variable, from a changed response, and
         according to the valuation, setting the optimized functional parameters.

2. The method as recited in claim 1, wherein the at least one weighting of the plurality of functional parameters is varied directly on the system.

3. The method as recited in claim 1, wherein the at least one weighting of the plurality of functional parameters is varied via an intermediate model, and the response is a response of the intermediate model.

4. The method as recited in claim 3, wherein, upon a desired optimization, the response of the intermediate model is used to implement the at least one weighting of the plurality of functional parameters on the system and the response is a response of the system.

5. The method as recited in claim 1, wherein the optimizer takes into account a development of the responses.

6. The method as recited in claim 1, wherein a number of target variables is specified, and the system response is specified via a weighting of the target variables.

7. The method as recited in claim 1, wherein the method is carried out within a software of a control unit.

8. The method as recited in claim 1, wherein the method is carried out outside of a software of a control unit.

9. The method as recited in claim 1, the method further comprising:
sending the optimized functional parameters for use in the system.

10. The method as recited in claim 1, wherein the plurality of functional parameters are initially each set to a default value.

11. The method as recited in claim 1, wherein the system has a plurality of operating points and the iterative determination of the optimized functional parameters is determined for one of the operating points of the system.

12. The method as recited in claim 11, wherein the iterative determination of the optimized functional parameters is determined for more than one of the plurality of operating points of the system.

13. The method as recited in claim 12, wherein the system learns a respective response for each of the more than one of the plurality of operating points.

14. The method as recited in claim 1, wherein the model is formed based on a similar system model that is stored in a control unit of the system.

15. The method as recited in claim 1, the valuating the varied at least one weighting of the plurality of functional parameters further comprising:
checking whether the changed response is one of an improvement or a worsening of the response of the system.

16. The method as recited in claim 1, wherein the optimizer outputs a prognosis on whether a further improvement of the response is able to be achieved.

17. The method as recited in claim 1, wherein the optimizer has a memory for storing the varied at least one weighting of the plurality of functional parameters.

18. A control unit having a computing unit, on which functions are carried out, the control unit configured to:
receive as input a response of a system and a specified at least one of a plurality of functional parameters from the response as a target variable;
iteratively determine optimized functional parameters according to the specified target variable by:
monitoring the received input of the response of the plurality of functional parameters of the system;
computing criteria from the monitored input;
forming a model having dependencies in the computed criteria according to the specified target variable; and
optimizing the formed model by:
varying at least one weighting of the plurality of functional parameters, and
valuating the varied at least one weighting of the plurality of functional parameters, by taking into account the specified target variable, from a changed response to set the optimized functional parameters; and
sending as output the optimized functional parameters for use in the system.

* * * * *